United States Patent
Biskeborn et al.

(10) Patent No.: US 10,811,036 B2
(45) Date of Patent: *Oct. 20, 2020

(54) FILLED-GAP MAGNETIC RECORDING HEAD AND METHOD OF MAKING

(71) Applicant: International Business Machines Corporation, Armonk, NY (US)

(72) Inventors: Robert G. Biskeborn, Hollister, CA (US); Icko E. T. Iben, Santa Clara, CA (US); Jason Liang, Campbell, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/154,596

(22) Filed: Oct. 8, 2018

(65) Prior Publication Data

US 2019/0051318 A1 Feb. 14, 2019

Related U.S. Application Data

(60) Division of application No. 14/835,644, filed on Aug. 25, 2015, now Pat. No. 10,134,429, which is a (Continued)

(51) Int. Cl.
*G11B 5/187* (2006.01)
*G11B 5/23* (2006.01)
*G11B 5/29* (2006.01)
*G11B 5/008* (2006.01)
*G11B 5/31* (2006.01)
(Continued)

(52) U.S. Cl.
CPC ............ *G11B 5/23* (2013.01); *G11B 5/00821* (2013.01); *G11B 5/00826* (2013.01); *G11B 5/10* (2013.01); *G11B 5/187* (2013.01); *G11B 5/1871* (2013.01); *G11B 5/232* (2013.01); *G11B 5/255* (2013.01); *G11B 5/2651* (2013.01); *G11B 5/295* (2013.01);
(Continued)

(58) Field of Classification Search
USPC ................................................ 360/316, 121
See application file for complete search history.

(56) References Cited

U.S. PATENT DOCUMENTS 4,130,847 A 12/1978 Head et al.
4,407,894 A 10/1983 Kadokura et al.
(Continued)

OTHER PUBLICATIONS

Non-Final Office Action from U.S. Appl. No. 11/110,140, dated Dec. 26, 2007.
(Continued)

*Primary Examiner* — Jefferson A Evans
(74) *Attorney, Agent, or Firm* — Zilka-Kotab, P.C.

(57) ABSTRACT

A magnetic head, according to one embodiment, includes a rowbar substrate having a tape support surface and a gap surface at a substrate edge. A closure is positioned opposite the gap surface of the rowbar substrate, the closure forming a portion of the tape support surface. A recessed gap region is interposed between the gap surface of the rowbar substrate and the closure, the recessed gap region having a recessed gap profile that extends between the gap surface of the rowbar substrate and the closure, the recessed gap region having a transducer row with at least one magnetic sensor on the gap surface of the rowbar substrate. An insulation layer is positioned over the recessed gap profile of the recessed gap region.

18 Claims, 9 Drawing Sheets

Related U.S. Application Data continuation of application No. 12/197,002, filed on Aug. 22, 2008, now Pat. No. 9,135,931, which is a continuation of application No. 11/110,140, filed on Apr. 19, 2005, now Pat. No. 7,477,482.

(51) Int. Cl.
  *G11B 5/265* (2006.01)
  *G11B 5/10* (2006.01)
  *G11B 5/255* (2006.01)
  *G11B 5/40* (2006.01)

(52) U.S. Cl.
  CPC .......... *G11B 5/3169* (2013.01); *G11B 5/3106* (2013.01); *G11B 5/40* (2013.01)

(56) References Cited

U.S. PATENT DOCUMENTS

| | | | |
|---|---|---|---|
| 5,761,790 A | 6/1998 | Carr et al. | |
| 5,815,910 A | 10/1998 | Park et al. | |
| 5,905,613 A | 5/1999 | Biskeborn et al. | |
| 6,122,147 A | 9/2000 | Fahimi et al. | |
| 6,267,903 B1 | 7/2001 | Watanuki | |
| 6,309,278 B1 | 10/2001 | Suzuki et al. | |
| 6,324,747 B1* | 12/2001 | Boutaghou | G11B 5/40 216/22 |
| 6,396,670 B1 | 5/2002 | Murdock | |
| 6,404,587 B1 | 6/2002 | Chaug et al. | |
| 6,580,586 B1 | 6/2003 | Biskeborn | |
| 6,678,123 B2 | 1/2004 | Takayama et al. | |
| 6,759,081 B2 | 7/2004 | Huganen et al. | |
| 6,785,953 B2 | 9/2004 | Santini | |
| 6,789,081 B1 | 9/2004 | Vanska | |
| 6,879,470 B2 | 4/2005 | Johnson et al. | |
| 7,477,482 B2 | 1/2009 | Biskeborn et al. | |
| 7,751,154 B2* | 7/2010 | Wu | G11B 5/3166 360/313 |
| 7,898,765 B2* | 3/2011 | Hachisuka | G11B 5/00826 360/122 |
| 8,009,386 B2* | 8/2011 | Hachisuka | G11B 5/3106 360/122 |
| 8,917,476 B2* | 12/2014 | Holmberg | G11B 5/00813 360/90 |
| 9,053,718 B1* | 6/2015 | Adrong | G11B 5/00826 |
| 9,135,931 B2 | 9/2015 | Biskeborn et al. | |
| 10,134,429 B2 | 11/2018 | Biskeborn et al. | |
| 2002/0078554 A1* | 6/2002 | Kobayashi | B82Y 10/00 29/603.15 |
| 2002/0191349 A1 | 12/2002 | Hsu et al. | |
| 2004/0032696 A1 | 2/2004 | Johnson et al. | |
| 2004/0161636 A1 | 8/2004 | Hujanen et al. | |
| 2004/0169958 A1 | 9/2004 | Krounbi et al. | |
| 2006/0232883 A1 | 10/2006 | Biskeborn et al. | |
| 2008/0266711 A1 | 10/2008 | Nibarger et al. | |
| 2008/0314736 A1 | 12/2008 | Biskeborn et al. | |
| 2011/0134569 A1* | 6/2011 | Allen | G11B 5/31 360/123.12 |
| 2015/0364147 A1 | 12/2015 | Biskeborn et al. | |

OTHER PUBLICATIONS

Notice of Allowance from U.S. Appl. No. 11/110,140, dated Jul. 14, 2008.
Restriction Requirement from U.S. Appl. No. 11/110,140, dated Sep. 21, 2007.
Non-Final Office Action from U.S. Appl. No. 12/197,002, dated Oct. 18, 2011.
Final Office Action from U.S. Appl. No. 12/197,002, dated Feb. 29, 2012.
Patent Board Decision on Appeal from U.S. Appl. No. 12/197,002, dated Feb. 20, 2015.
Notice of Allowance from U.S. Appl. No. 12/197,002, dated May 4, 2015.
Corrected Notice of Allowability from U.S. Appl. No. 12/197,002, dated Jun. 3, 2015.
Biskeborn et al., U.S. Appl. No. 11/110,140, filed Apr. 19, 2005.
Biskeborn et al., U.S. Appl. No. 12/197,002, filed Aug. 22, 2008.
Examiner's Answer to Appeal Brief from U.S. Appl. No. 12/197,002, dated Oct. 3, 2012.
Biskeborn et al., U.S. Appl. No. 14/835,644, filed Aug. 25, 2015.
Restriction Requirement from U.S. Appl. No. 14/835,644, dated May 17, 2017.
Non-Final Office Action from U.S. Appl. No. 14/835,644, dated Sep. 8, 2017.
Final Office Action from U.S. Appl. No. 14/835,644, dated Dec. 27, 2017.
Ex Parte Quayle from U.S. Appl. No. 14/835,644, dated Feb. 26, 2018.
Notice of Allowance from U.S. Appl. No. 14/835,644, dated Jul. 13, 2018.

* cited by examiner

SECTION A-A

FILLED-GAP MAGNETIC RECORDING HEAD AND METHOD OF MAKING

BACKGROUND

This invention relates to magnetic tape recording heads, and more particularly, to a tape recording head having a pre-recessed gap region filled with an electrical insulation material.

In magnetic storage systems, data is read from and written onto magnetic recording media utilizing magnetic transducers commonly referred to as magnetic heads. Data is written on the magnetic recording media by moving a magnetic recording head to a position over the media where the data is to be stored. The magnetic recording head then generates a magnetic field, which encodes the data into the magnetic media. Data is read from the media by similarly positioning the magnetic read head and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has lead to increasing the track density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. This movement generally entrains a film of air between the head and tape. Usually the tape head is designed to minimize the spacing between the head and the tape. The spacing between the magnetic head and the magnetic tape is crucial so that the recording gaps of the transducers, which are the source of the magnetic recording flux, are in intimate or near contact with the tape to effect efficient signal transfer, and so that the read element is in intimate or near contact with the tape to provide effective coupling of the magnetic field from the tape to the read element.

A flat contour thin film tape recording head for a bi-directional tape drive is described in commonly assigned U.S. Pat. No. 5,905,613 to Biskeborn and Eaton. The flat contour head comprises a flat tape support surface on a substrate having a row of thin film transducers formed on a surface on one side of the substrate which forms a gap. The substrate with the row of transducers is called a "rowbar substrate". The transducers are protected by a closure of the same or similar ceramic as the substrate. For a read-while-write bi-directional head which requires that the read transducer follows behind the write transducer, two rowbar substrates with closures are mounted in a carrier opposing one another. The recording tape overwraps the corners of both substrates and closures with an angle sufficient to scrape (skive) the air from the surface of the tape and not so large as to allow air to reenter between the tape and the tape support surface after the tape passes the corner. By scraping the air from the surface of the moving tape, a vacuum forms between the tape and the flat tape support surface holding the tape in contact with the tape support surface. At the corners of the air skiving edge, bending of the recording tape due to the overwrap results in separation of the tape from the tape support surface for a distance that depends on the wrap angle, the tape thickness and the tape tension. The transducers must be spaced from the corners of the air skiving edges at a sufficient distance to allow the pressure difference between ambient air and the vacuum between the tape and the tape support surface to overcome this separation.

Recession of the gap region between the hard ceramic substrate and closure due to tape wear is a problem that results in increased spacing loss of the readback signal. Efforts to minimize gap erosion in hard disk drive type ceramic tape heads usually involves making the gap materials more wear resistant or coating the head with wear resistant material. Another problem that can occur is accumulation of conductive debris and wear material in the recessed region that results in electrical shorting of the magnetoresistive (MR) transducer elements in the gap to other electrically conductive elements in the gap. Yet another problem is corrosion of giant magnetoresistive (GMR) or magnetic tunnel junction (MTJ) sensors when exposed directly to running tape.

The present invention addresses the need for a tape recording head that eliminates or reduces the harmful effects of accumulated conductive debris to improve reliability and component life and that insulates anisotropic magnetoresistive (AMR), GMR and MTJ sensors from electrical charge exchange with the tape.

BRIEF SUMMARY

A magnetic head, according to one embodiment, includes a rowbar substrate having a tape support surface and a gap surface at a substrate edge. A closure is positioned opposite the gap surface of the rowbar substrate, the closure forming a portion of the tape support surface. A recessed gap region is interposed between the gap surface of the rowbar substrate and the closure, the recessed gap region having a recessed gap profile that extends between the gap surface of the rowbar substrate and the closure, the recessed gap region having a transducer row with at least one magnetic sensor on the gap surface of the rowbar substrate. An insulation layer is positioned over the recessed gap profile of the recessed gap region.

BRIEF DESCRIPTION OF THE SEVERAL VIEWS OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings:

FIG. 3b is a top view, not to scale, of one read-write transducer portion of the gap region of FIG. 3a.

DETAILED DESCRIPTION

Figure 1:
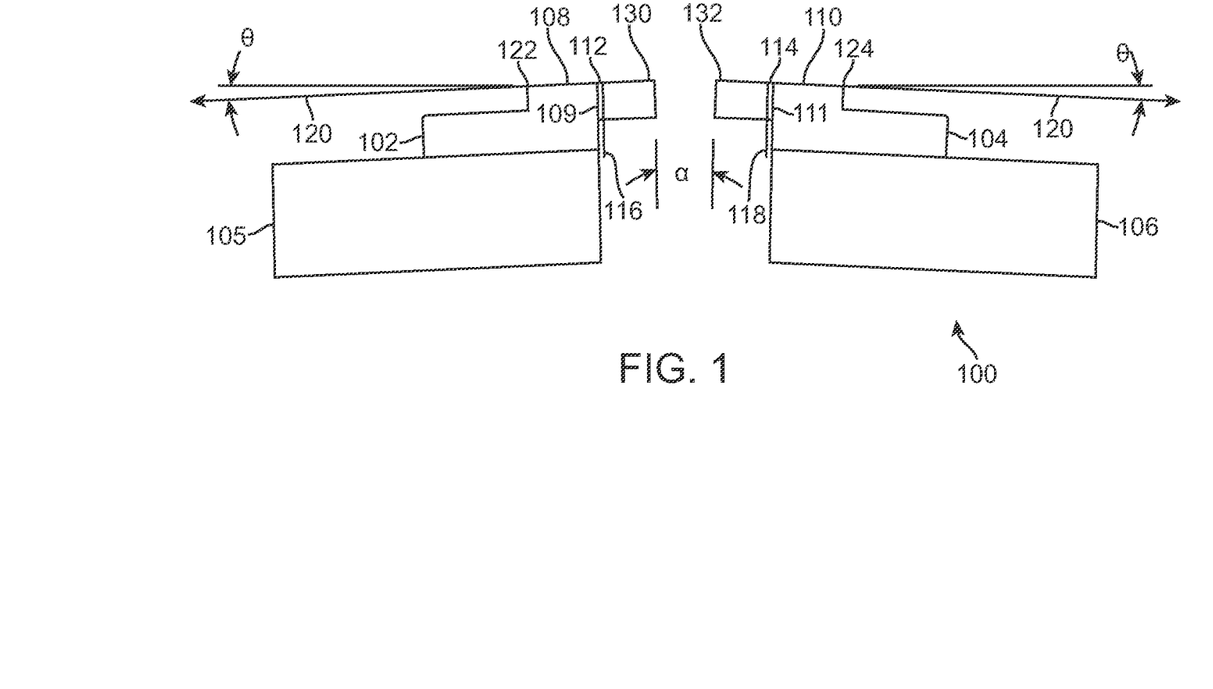
FIG. 1 is a cross-sectional view, not to scale, of a read-while-write bi-directional flat contour linear tape recording head.

FIG. 1 illustrates a bi-directional read-while-write flat contour head 100 using the present invention. Rowbar substrates 102 and 104 of a wear resistant material, such as the substrate ceramic typically used in magnetic disk drive heads, are mounted in carriers 105 and 106 fixed at a small angle $\alpha$ with respect to each other. The ceramic rowbar substrates 102 and 104 are provided with flat tape support surfaces 108 and 110 and gap surfaces 109 and 111 and a row of transducers at the surfaces of gap regions 112 and 114. Electrical connection cables 116 and 118 connect the transducers to the read/write channel of the associated tape drive. The wrap angle $\vartheta$ of the tape 120 at edges 122 and 124 going onto the flat tape support surfaces 108 and 110, respectively, and angle $\alpha$/2 are usually between ⅛ degree and 4.5 degrees. The rows of transducers are protected by closures 130 and 132 made of the same or similar ceramic as the rowbar substrates 102 and 104.

Figure 2:
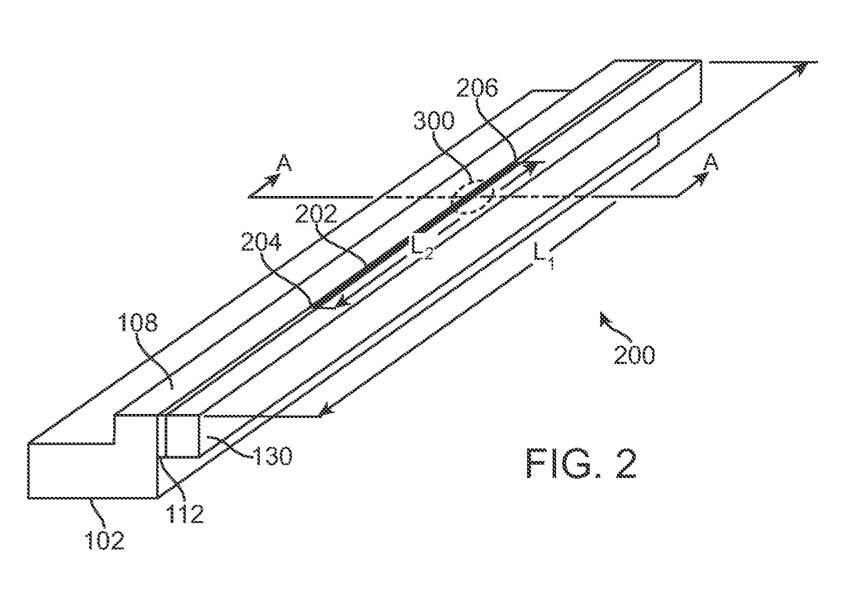
FIG. 2 is a perspective view, not to scale, of a rowbar substrate and closure assembly incorporating the present invention.

FIG. 2 is a perspective view of a rowbar substrate and closure assembly 200 comprising the rowbar substrate 102, the closure 130 and the gap region 112 shown in FIG. 1. The assembly 200 has a length $L_1$ greater than the width of the magnetic recording tape 120 extending in direction perpendicular to the direction of the linear motion of the tape across the head 100. The flat tape support surface 108 supports the tape as it moves across the head. A row of transducers 202 positioned in the gap region 112 and having a length $L_2$ less than the width of the tape is centered along the length direction of the assembly 200. The row of transducers 202 comprises a plurality of read and write transducers for reading and writing data on the magnetic recording tape. Servo read transducers which may be located at first and second ends 204 and 206 of the row of transducers 202 are used to position the read and write transducers over data tracks written on the magnetic recording tape.

Figure 3A:
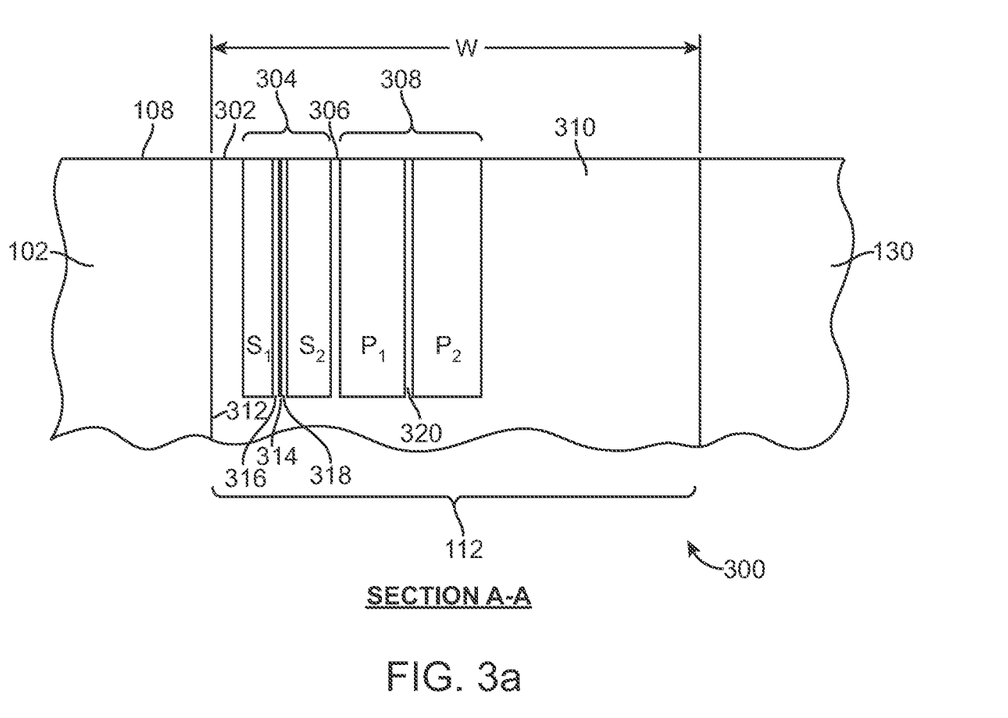
FIG. 3a is a cross-sectional view, not to scale, of the gap region of the rowbar substrate and closure assembly after lapping.
Figure 3B:
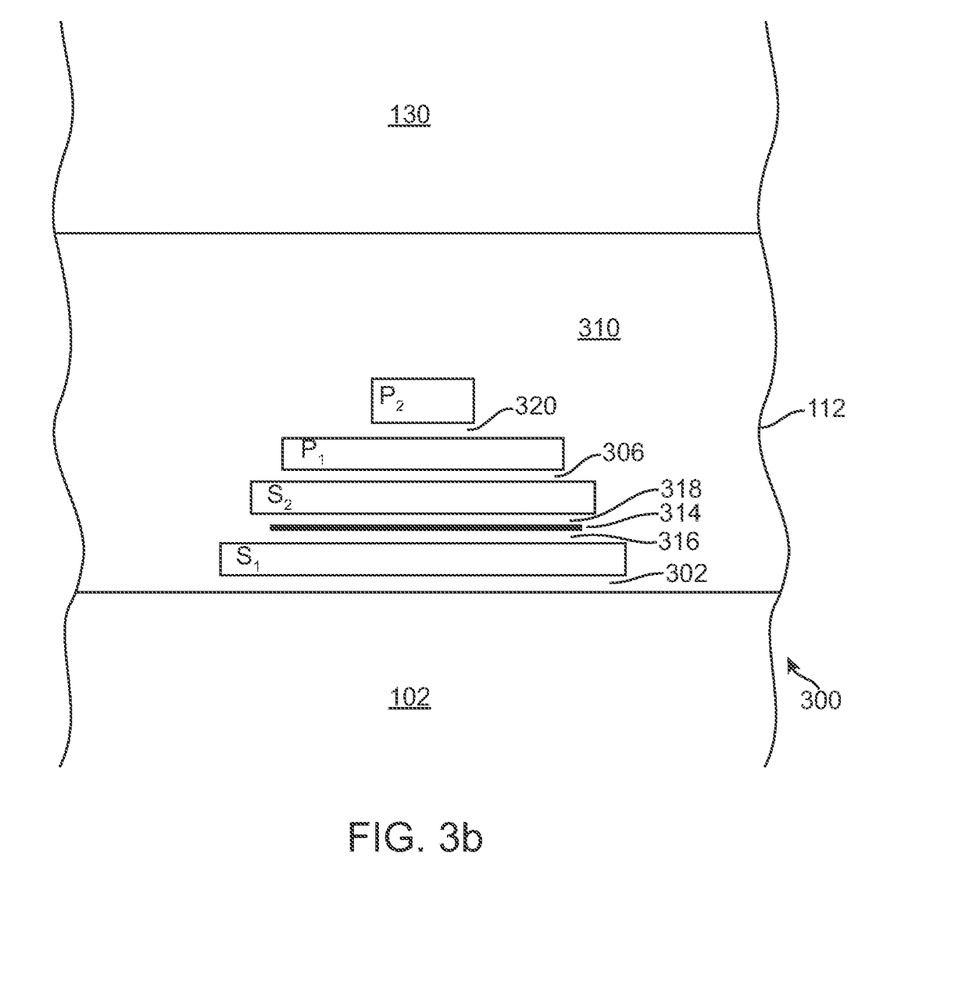
Figure 3C:
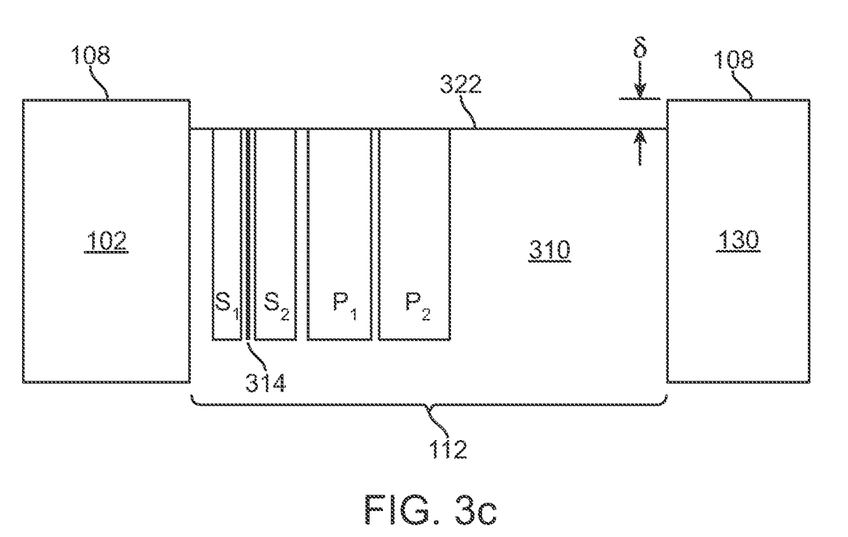
FIG. 3c is a cross-sectional view, not to scale, of the gap region of the rowbar substrate and closure assembly after a forced recession process.
Figure 3D:
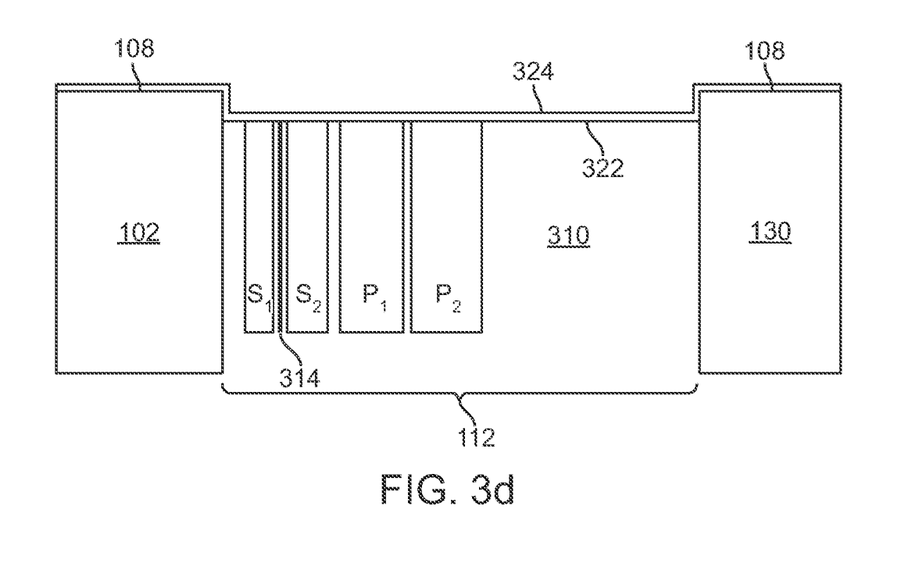
FIG. 3d is a cross-sectional view, not to scale, of an embodiment of the gap region of the rowbar substrate and closure assembly after deposition of a layer of insulation material.

FIGS. 3a, 3c and 3d are cross-sectional views of the gap 112 of assembly 200 illustrating the structure of the gap region at various stages of fabrication of the filled-gap recording head of the invention. FIG. 3a shows sections A-A indicated on FIG. 2 as area 300 through the middle region of the rowbar substrate and closure assembly 200 near the tape support surface 108 where the row of transducers 202 are present. FIG. 3b is a top view of one read-write transducer portion of the gap region of FIG. 3a. The gap 112 comprises an undercoat 302 of aluminum oxide, a read transducer 304, an insulation layer 306 of aluminum oxide, a write transducer 308 and an overcoat 310 of aluminum oxide sandwiched between the rowbar substrate 102 and the closure 130. These elements are formed on the rowbar substrate surface 312 by wafer deposition methods well known to those skilled in the art. Closure 130 is then fixed to the overcoat 310 to protect the transducers in the gap region. Typically, the gap 112 has a width W of about 30-35 microns. The read transducer 304 comprises an MR transducer sandwiched between first and second shields $S_1$ and $S_2$, respectively, formed of a soft magnetic material such as permalloy. The MR transducer, which may be an anisotropic magnetoresistance (AMR) sensor, a giant magnetoresistance (GMR) sensor or a tunneling magnetoresistance (TMR) sensor, is electrically insulated from $S_1$ and $S_2$ by insulator layers 316 and 318 formed of aluminum oxide. The write transducer 308 comprises a write gap 320 formed of non-magnetic material between first and second write poles $P_1$ and $P_2$, respectively, formed of soft magnetic material such as permalloy. After the deposition of the layers comprising the gap 112 and attachment of the protective closure 130, the tape support surface 108 is lapped to obtain the desired poletip dimensions of poles $P_1$ and $P_2$ and a flat or cylindrical surface finish. The gap region 300 of the fabrication stage shown in FIG. 3a is essentially equivalent to the completed gap region of conventional tape recording heads.

FIG. 3c is a cross-sectional view of the gap 112 of assembly 200 after a forced recession process step has been completed on the gap structure shown in FIG. 3a. The gap 112 has been intentionally recessed below the tape support surface 108 to create a uniformly recessed gap profile 322. The recession $\alpha$ of the recessed gap profile 322 from the tape support surface 108 in the range of 20-50 nm is achieved by running a chromium oxide recording tape over the tape support surface of the recording head. Etching by the chromium oxide recording tape is not selective and has been found to etch all the gap components at approximately the same rate creating a very uniform recessed gap profile. The desired recession produced by this process should be approximately equivalent to the recession asymptote due to long term tape wear of a conventional head under normal operating conditions. This recession has been found to be easily achieved by running two round trips of an 85 meter length of chromium oxide tape over the head. Alternatively, other tapes including chrome, diamond and aluminum oxide, may be used to intentionally recess the gap 112.

Alternatively, ion milling, sputtering, chemical-mechanical lapping, grinding and sputtering processes may be used to intentionally recess the gap 112. Sputtering is less attractive since sputtering rates differ for different materials leading to selective etching of the gap components. Because of the small dimensions of the gap region and the desired recession $\alpha$, grinding would require a very high precision process which may be difficult to implement.

After the intentional recession of the gap 112 by conditioning with the chromium oxide tape is completed, the head is placed in a vacuum system where it is sputter cleaned in an argon-hydrogen plasma for less than 1 minute to remove residual debris and other contamination from the recessed gap profile 322. If selective pole tip etching is desired a longer sputter clean time may be used. After cleaning, an electrically insulating layer 324 having a thickness in the range of 4-20 nm is deposited on the tape support surface 108 and the recessed gap as shown in FIG. 3d. Insulating layer 324 is preferably a hard stoichiometric film of aluminum oxide or other similar material including low stress diamond-like carbon (DLC), silicon nitride, boron nitride, silicon carbide and silicon oxide. The requirement for the insulation layer 324 is that it is wear resistant, but not necessarily wear proof as a low wear rate is acceptable. Running tape on the head may wear the insulation layer 324 of the tape support surface 108, however the wear rate of the insulation layer in the gap 112 is slow due to the recession $\alpha$ of the gap profile 322. Insulation layers 324 thinner than 4-10 nm are possible if pinholes are not a problem. Thicker insulation layers 324 are generally not desirable due to initial head tape separation which adds to the gap recession. Over the life of the head, the MR transducer 314 is protected by the insulation layer 324 from shorting to conductive components, including the shields $S_1$ and $S_2$, the poles $P_1$ and $P_2$, the rowbar substrate 102 and the closure 130, by accumulations of conductive material from the recording tape 120 or by ductile motion (smearing) of head metallic components. The insulation layer also serves a secondary purpose of protecting sensitive transducers, such as GMR and TMR transducers, from direct contact with the tape which may result in failure of the transducers.

Alternatively, after the intentional recession of the gap 112 by conditioning with the chromium oxide tape, the head may be used in a tape drive without deposition of the insulator layer 324. However, to obtain the full benefit of recession of the gap 112, deposition of the insulator layer provides additional protection from shorting of the MR transducer by accumulated conductive debris.

Figure 4A:
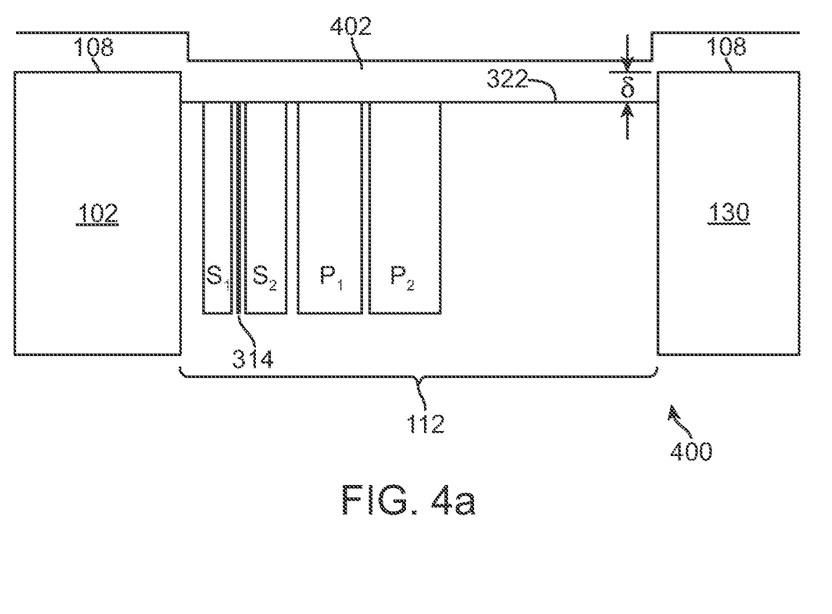
FIG. 4a is a cross-sectional view, not to scale, of another embodiment of the gap region of the rowbar substrate and closure assembly after deposition of a layer of insulation material.
Figure 4B:
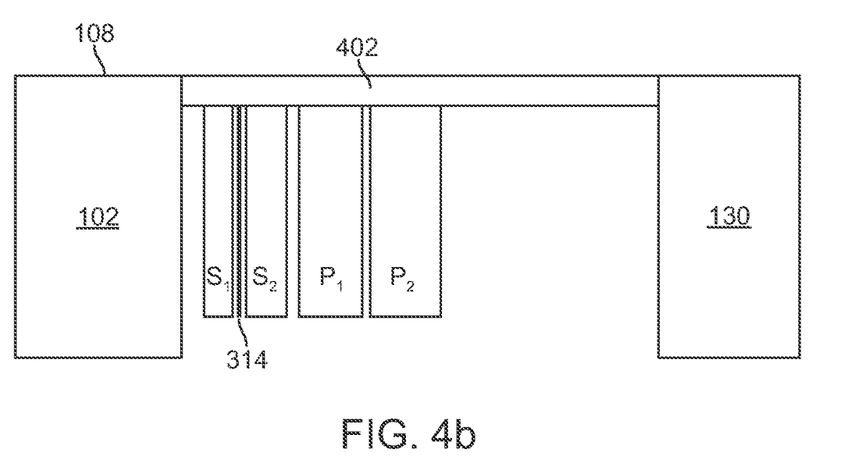
FIG. 4b is a cross-sectional view, not to scale, of the gap region of the rowbar substrate and closure assembly of FIG. 4a after lapping.

FIGS. 4a and 4b illustrate another embodiment of the filled-gap magnetic recording head of the present invention described with reference to FIGS. 2 and 3a-3c. The embodiment shown in FIGS. 4a and 4b is the same as the embodiment shown in FIGS. 3a-3c except that after sputter cleaning of the intentionally recessed gap 112 as described herein above, an insulation layer 402 thick enough to fill the gap 112 approximately to the level of the tape support surface 108 is deposited on the tape support surface 108 and the surface of the recessed gap profile 322. FIG. 4a is a cross-sectional view of the area 300 of the gap 112 of assembly 200 after deposition of the insulation layer 402. FIG. 4b is a cross-sectional view of the area 300 after a lapping process of the tape support surface of the rowbar substrate and substrate assembly to reduce the thickness of the insulation layer 402 to the level, or very nearly to the level of the tape support surface 108 of the rowbar substrate 102 and the closure 130. Lapping of the assembly may be done by kiss lapping or by chemical-mechanical polishing methods known to the art.

Figure 5:
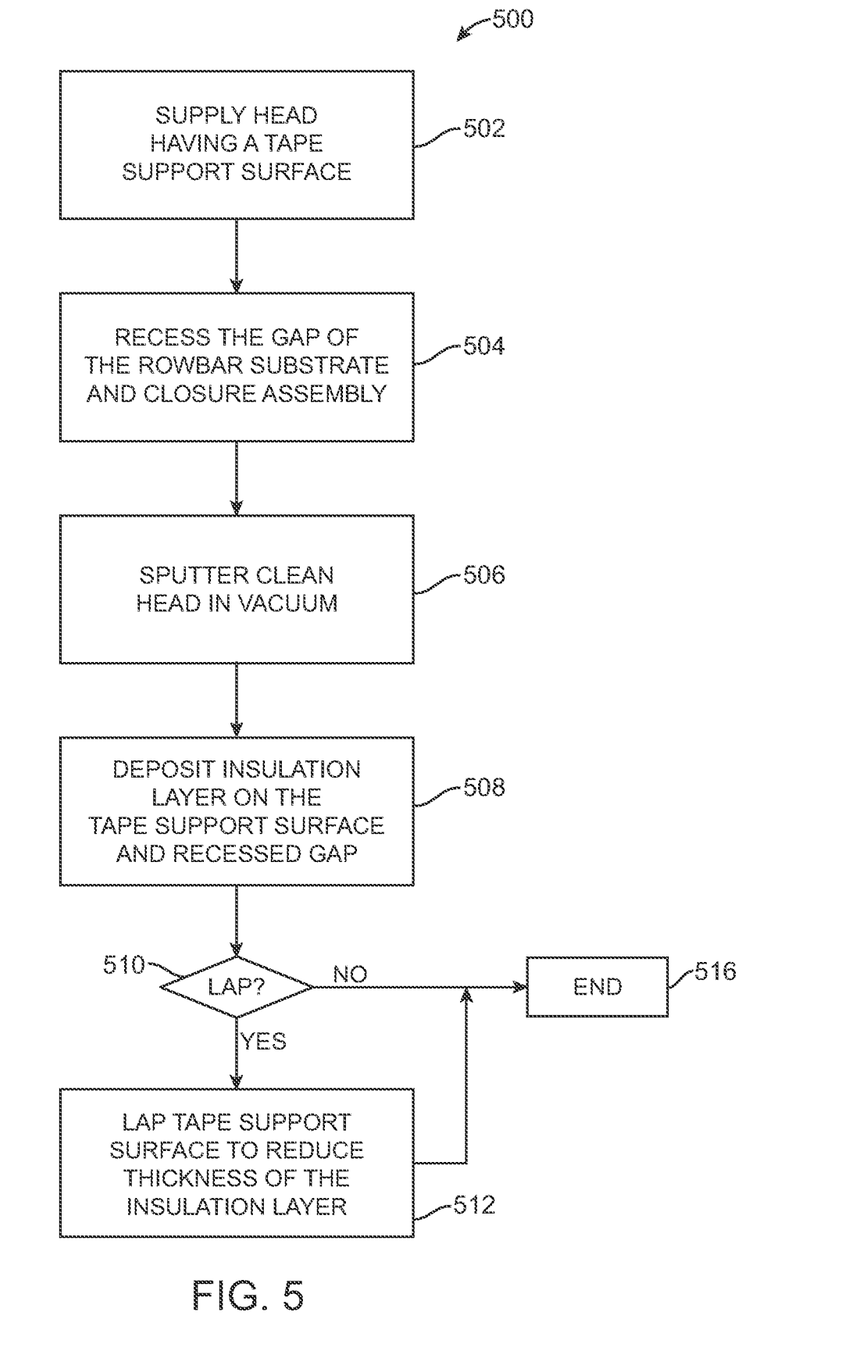
FIG. 5 is a flow chart of a method of making a filled-gap magnetic recording head according to the present invention.

FIG. 5 is a flow chart of a method 500 of making a filled-gap magnetic recording head according to the present invention. In step 502, a magnetic tape head 100 having a lapped transducing surface 108 is supplied. In step 504, the gap region 112 of the rowbar substrate and closure assembly 200 is intentionally recessed an by an amount ⌘ in the range of 20-50 nm below the tape support surface 108, preferably by running a chromium oxide tape over the tape support surface. In step 506, the rowbar substrate and closure assembly 200 is placed in a vacuum and the tape support surface 108 and recessed gap profile 322 is sputter cleaned, preferably in an argon-hydrogen plasma. In step 508, an insulation layer 324 is deposited by vacuum deposition methods on the tape support surface 108 and on the surface of the recessed gap profile 322. The deposited insulation layer may have a thickness less than the recession ⌘, preferably in the range of 4-20 nm, or alternatively may have a thickness greater than the recession ⌘. In step 510, a decision is made whether or not to reduce the thickness of the insulation layer 324. If reducing the thickness of the deposited insulation layer 324 is not desired the process ends at step 516. If it is desired to reduce the thickness the insulation layer deposited on the tape support surface 108 of the rowbar substrate 102 and closure 130, for example, as illustrated in FIG. 4a, in step 512 the tape support surface 108 of the assembly 200 is lapped, preferably by a kiss-lapping process to reduce the thickness of the insulation layer on the tape support surface 108 the desired amount. Preferably, the thickness of the insulation layer on the tape support surface 108 is small to prevent a significant increase of the recording tape-transducer separation in the recessed gap region. The process is then ended at step 516.

A novel feature of the present invention is providing a forced or intentional recession by a predetermined amount ⌘ creating a gap profile 322 prior to the deposition of an electrical insulation layer 324. The electrical insulation layer in the gap 112 is less exposed to wear by the recording tape 120 for the duration of the head lifetime while avoiding the problem of excessive spacing of the recording tape from the read and write transducers. The insulation layer eliminates MR transducer resistance reduction and resistance fluctuations caused by accumulations of conductive materials from the magnetic recording tape which can result in tape drive field failures.

Figure 6:
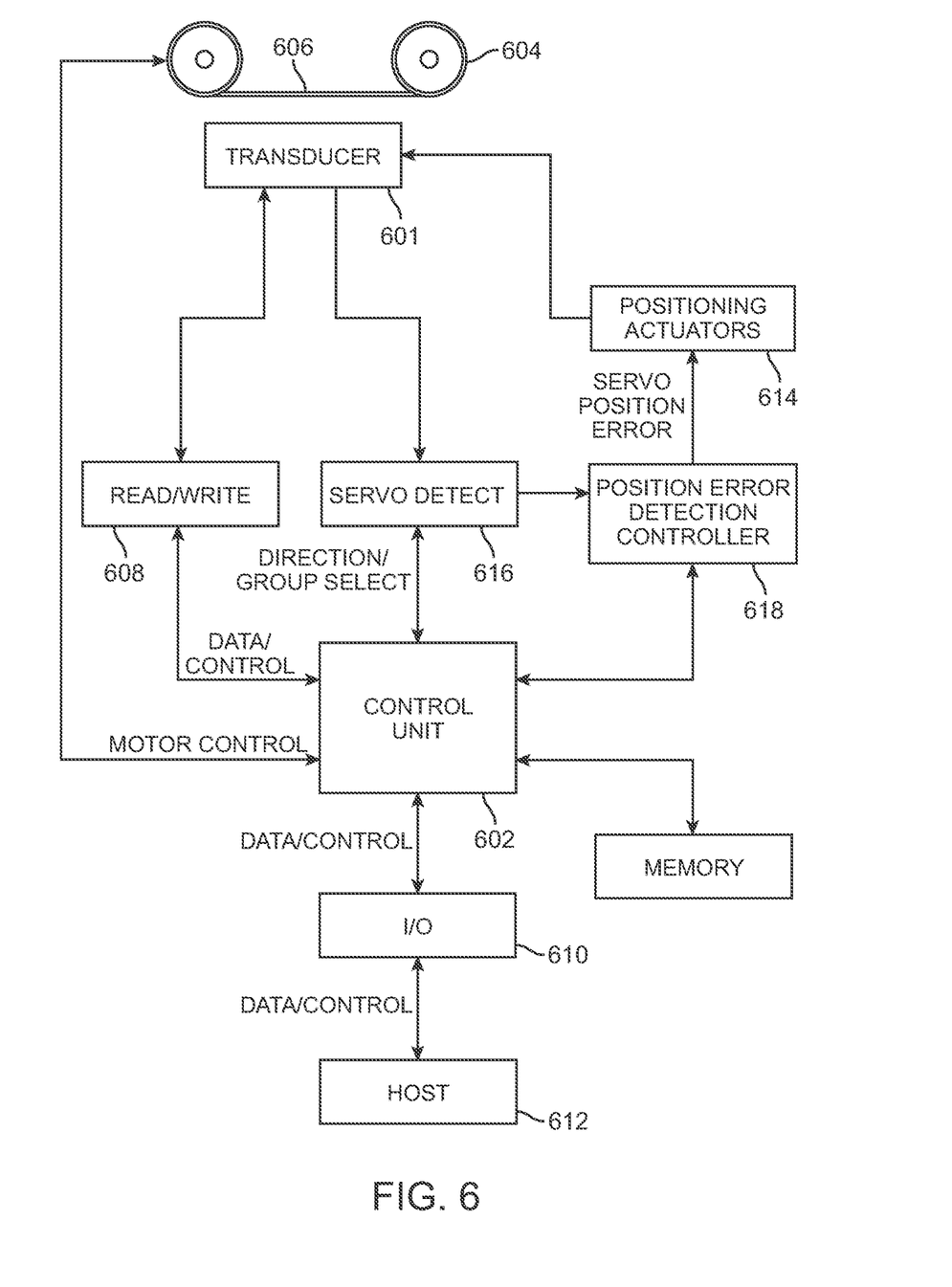
FIG. 6 is a simplified diagram of a magnetic tape recorder system using the magnetic recording head of the present invention.

FIG. 6 illustrates an embodiment of a magnetic tape recorder or tape drive system 600 incorporating the filled-gap magnetic recording head of the present invention. A tape drive control unit 602 provides a motor control signal to rotate tape reels 604 and move magnetic tape 606 across the read/write transducer head 601. Read/write channel 608 transmits read/write signals between the read/write transducer 601 and the control unit 602. The data is communicated through I/O channel 610 with host 612. Lateral positioning of the transducer 601 with respect to the tape 606 is accomplished by positioning actuator 614. The lateral repositioning is required to access the various tracks of the tape 606 with the transducer 601. A servo system may be employed for accurate lateral repositioning of the transducer 601. An exemplary servo system includes a servo detector 616 to detect both the track that the head is currently on and whether the head is off center. Control unit 602 indicates the track address of a desired new track to position error detection controller 618 for repositioning the head. Servo detector 616 indicates the current track to position error detection controller 618, and the controller provides a servo position error signal to positioning actuator 614 which repositions the transducer 601 to the new track. The servo system also provides track following signals to positioning actuator 614 so that the tracks on tape 606 may be closely spaced.

While the present invention has been particularly shown and described with reference to the preferred embodiments, it will be understood by those skilled in the art that various changes in form and detail may be made without departing from the spiryit, scope and teaching of the invention. Accordingly, the disclosed invention is to be considered merely as illustrative and limited only as specified in the appended claims.

We claim:

1. A magnetic head, comprising:
 a rowbar substrate having a tape support surface and a gap surface at a substrate edge;
 a closure opposite the gap surface of the rowbar substrate, said closure forming a portion of the tape support surface;
 a recessed gap region interposed between the gap surface of the rowbar substrate and the closure, the recessed gap region having a recessed gap profile that extends from the gap surface of the rowbar substrate to the closure, the recessed gap region having a transducer row with at least one magnetic sensor on the gap surface of the rowbar substrate; and an insulation layer over the recessed gap profile of the recessed gap region and extending from the gap surface of the rowbar substrate to the closure,
wherein about an entire upper surface of the insulation layer directly above the recessed gap region is recessed from the tape support surface.

2. The magnetic head recited in claim 1, wherein the recessed gap profile is recessed in the range of 10-50 nm from the tape support surface of the rowbar substrate and the tape support surface of the closure.

3. The magnetic head recited in claim 2, wherein the insulation layer has a thickness in the range of 4-20 nm.

4. The magnetic head recited in claim 2, wherein the insulation layer has a thickness approximately equal to the thickness of the recession of the recessed gap profile from the tape support surface.

5. The magnetic head recited in claim 1, wherein the insulation layer has a thickness in the range of 4-20 nm.

6. The magnetic head recited in claim 1, wherein the insulation layer has a thickness approximately equal to the thickness of the recession of the recessed gap profile from the tape support surface.

7. The magnetic head recited in claim 1, wherein the insulation layer includes a material selected from the group consisting of aluminum oxide, silicon nitride, boron nitride, silicon carbide, silicon oxide and diamond-like carbon.

8. The magnetic head recited in claim 1, wherein the gap profile is substantially uniformly recessed.

9. The magnetic head recited in claim 8, wherein the gap profile is recessed in the range of 10-50 nm from the tape support surface of the rowbar substrate and the tape support surface of the closure.

10. The magnetic head recited in claim 9, wherein the insulation layer has a thickness in the range of 4-20 nm.

11. The magnetic head recited in claim 9, wherein the insulation layer has a thickness approximately equal to the thickness of the recession of the recessed gap profile from the tape support surface.

12. The magnetic head recited in claim 1, wherein the insulation layer comprises aluminum oxide.

13. The magnetic head recited in claim 1, wherein the insulation layer comprises silicon nitride.

14. The magnetic head recited in claim 1, wherein the insulation layer comprises boron nitride.

15. The magnetic head recited in claim 1, wherein the insulation layer comprises silicon carbide.

16. The magnetic head recited in claim 1, wherein the insulation layer comprises silicon oxide.

17. The magnetic head recited in claim 1, wherein the insulation layer comprises diamond-like carbon.

18. A magnetic tape recorder system comprising:
a magnetic head having:
a rowbar substrate having a tape support surface and a gap surface at a substrate edge,
  a closure opposite the gap surface of the rowbar substrate, said closure forming a portion of the tape support surface,
  a recessed gap region interposed between the gap surface of the rowbar substrate and the closure, the recessed gap region having a recessed gap profile that extends from the gap surface of the rowbar substrate to the closure, the recessed gap region having a transducer row with at least one magnetic sensor on the gap surface of the rowbar substrate, and
  an insulation layer over the recessed gap profile of the recessed gap region and extending from the gap surface of the rowbar substrate to the closure, wherein about an entire upper surface of the insulation layer above the recessed gap region is recessed from the tape support surface; and
a control unit configured to provide a motor control signal to cause a magnetic tape to move across the magnetic head.

* * * * *